United States Patent [19]

Nozaki

[11] Patent Number: 5,149,169
[45] Date of Patent: Sep. 22, 1992

[54] SEAL STRUCTURE FOR THE ENGINE HOOD OF A MOTOR VEHICLE

[75] Inventor: Masahiro Nozaki, Inazawa, Japan

[73] Assignee: Toyoda Gsoei Co., Ltd., Nishikasugai, Japan

[21] Appl. No.: 716,112

[22] Filed: Jun. 17, 1991

[30] Foreign Application Priority Data

Jun. 18, 1990 [JP] Japan .................. 2-159575

[51] Int. Cl.⁵ ............................. B60J 10/00
[52] U.S. Cl. .................. 296/206; 296/194; 180/69.22; 362/80
[58] Field of Search .............. 296/194, 206; 180/69.2–69.23; 362/80

[56] References Cited

U.S. PATENT DOCUMENTS

| | | | |
|---|---|---|---|
| 4,475,148 | 10/1984 | Tomforde | 362/80 X |
| 4,614,347 | 9/1986 | Kruschwitz | 52/208 X |
| 4,617,220 | 10/1986 | Ginster | 428/122 |
| 4,799,131 | 1/1989 | Aho et al. | 362/80 X |
| 4,977,487 | 12/1990 | Okano | 362/80 X |

FOREIGN PATENT DOCUMENTS

| | | | |
|---|---|---|---|
| 0046008 | 10/1980 | Japan | 296/206 |
| 0265401 | 10/1989 | Japan | 362/80 |
| 898102 | 6/1962 | United Kingdom | 362/80 |

Primary Examiner—Dennis H. Pedder
Attorney, Agent, or Firm—Cushman, Darby & Cushman

[57] ABSTRACT

A seal structure for sealing a gap between a front edge of an engine hood of a slant-nose type motor vehicle and an upper edge of a head lamp thereof. At the upper edge of the head lamp, there is provided a projection having a upwardly and rearwardly inclined front surface and a vertically extending rear surface. A top edge of the projection faces the front edge of the engine hood and is spaced therefrom to define a small gap. A seal member is attached to an upper surface of the head lamp in close contact with the rear surface of the projection. The seal member is composed of a base portion which preferably has an L-shaped cross-section, and a sealing portion extending obliquely rearwardly from an upper end of the base portion. The sealing portion of the seal member seals the small gap between the engine hood and the projection.

9 Claims, 3 Drawing Sheets

SEAL STRUCTURE FOR THE ENGINE HOOD OF A MOTOR VEHICLE

BACKGROUND OF THE INVENTION

1. Field of the Invention

The present invention relates to a seal structure for the engine hood of a motor vehicle and, more particularly, to a seal structure for sealing the gap between the front edge of the engine hood of a slant-nose type motor vehicle and the upper edge of its head lamp.

2. Description of the Prior Art

In order to seal the gap between the front edge of an engine hood of a motor vehicle and the upper edge of its head lamp, as shown in FIG. 5, conventionally a seal member 4 has been attached to a lower surface of the engine hood 1 with a clip 6. When the engine hood 1 is closed, the seal member 4 comes into pressure contact with an upper surface of head lamp 2.

Recently, in order to reduce the air resistance generated around motor vehicles, the number of slant-nose type motor vehicles has increased. In the slant-nose type motor vehicle, as shown by the broken line in FIG. 5, the front surface of the head lamp 2 is rearwardly and upwardly inclined and continues to the upper surface of the engine hood 1 through a gap D. In the slant-nose type motor vehicle, the width D1 of the gap D between a front edge of the engine hood 1 and the upper edge of the head lamp 2 is greater than that of other types of motor vehicles.

The width D1 of the gap D can be sealed by elongating the seal member 4 forwardly from the front edge of the engine hood 1. With this seal structure, however, the configuration of the seal member 4 is unstable both when the engine hood 1 is closed and when it is open. Furthermore, the seal member 4 of a greater width is exposed, which undesirably exposes the seal structure.

SUMMARY OF THE INVENTION

It is an object of the present invention to improve the appearance of a seal member between an engine hood and a head lamp in a slant-nose type motor vehicle, and also to improve the stability of the seal member.

In accordance with the seal structure of the present invention, a head lamp of a Slant-Nose type motor vehicle is provided which has a projection having a front surface which extends continuously from an upper end of a front surface of the head lamp in a direction toward an upper surface of the engine hood while gently slanting backwards. Furthermore, a seal member is provided which has a seal surface for sealing the gap between an upper edge of the projection of the head lamp and the front edge of the engine hood. The seal is attached to an upper surface of the head lamp so as to be pressed downwardly when the engine hood is closed.

By providing the projection on the head lamp, the gap between the head lamp and the engine hood can be decreased. Furthermore, by attaching the seal member to the head lamp, the stability of the seal member is improved.

BRIEF DESCRIPTION OF THE DRAWING

Other objects, features and characteristics of the present invention will become apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Figure 1:
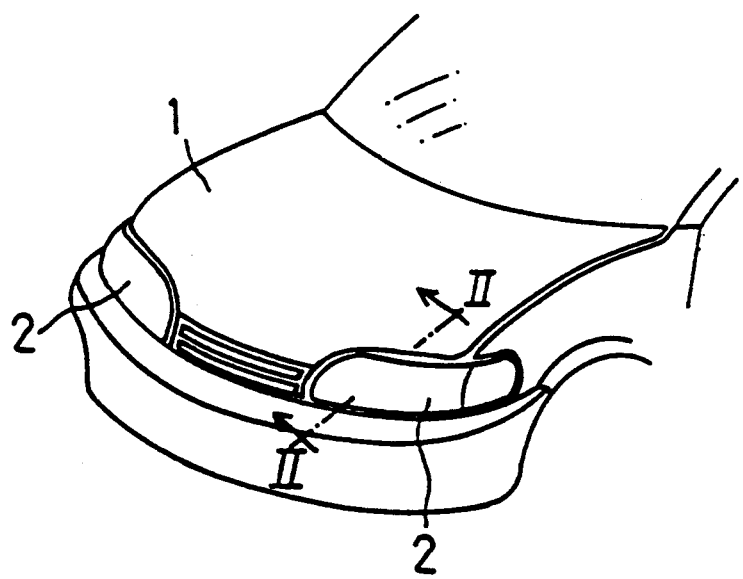
FIG. 1 is a perspective view of a front portion of a motor vehicle to which a seal structure of the present invention is applied.
Figure 2:
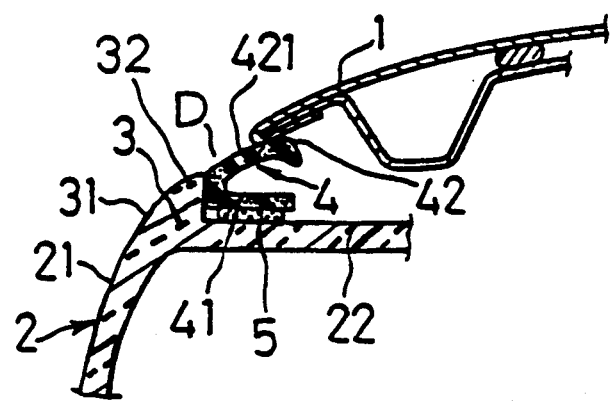
FIG. 2 is a cross-sectional view of a first embodiment of a seal structure in accordance with the present invention, which is taken along the line II—II of FIG. 1.

FIGS. 1 and 2 illustrate a first embodiment of a seal structure in accordance with the present invention. In the drawings, a projection 3 having a nearly triangular cross-section is formed along a front edge of an upper surface 22 of each of the left and right head lamps 2. A front surface 21 of each head lamp 2 is inclined upwardly and rearwardly and continues to a front surface 31 of each projection 3. The front surface 31 is also inclined upwardly and rearwardly and continues to an upper surface of an engine hood 1 through a narrow gap D. A rear surface 32 of each projection 3 extends in a direction which is substantially perpendicular to the upper surface 22 of each head lamp 2.

A seal member 4 made of sponge rubber is attached to the upper surface 22 of each head lamp 2 with a double sided adhesive tape 5. The seal member 4 is composed of a base portion 41 having an L-shaped cross-section, and a lip-shaped sealing portion 42 which extends obliquely rearwardly from an upper end of a vertical part of the base portion 41. The vertical part of the base portion 41 of the seal member 4 closely contacts the rear surface 32 of the projection 3.

The height of the vertical part of the base portion 41 is substantially equal to that of the projection 3. A seal surface 421 of the lip-shaped sealing portion 42 is an extension of the front surface 31 of the projection 3. The seal surface 421 is substantially flush with the upper surface of the engine hood 1.

With the above-described seal structure, the width D1 of the gap D between the engine hood 1 and each head lamp 2 can be decreased by virtue of the projection 3. This results in the length of the exposed part of the sealing portion 42 being decreased, and accordingly, the appearance around the engine hood 1 being improved. Furthermore, the configuration of the seal member 4 can be kept stable because the seal member 4 is attached while contacting both the upper surface 22 of the head lamp 2 and the rear surfaces 32 of the projection 3, and also the length of the sealing portion 42 of the seal member 4 can be reduced due to the decrease of the gap D.

The seal member 4 may be attached to the engine hood 1 rather than the head lamp 2. In that case, however, it is very difficult to adapt the front edge of the seal member 4 to engage the projection 3. If the seal member 4 is too short, a gap is formed between the seal member 4 and the projection 3 when the engine hood 1 is closed. If too long, the front edge of the seal member 4 may be caught by the top end of the projection 3. Accordingly, this seal structure is less desirable.

Figure 3:
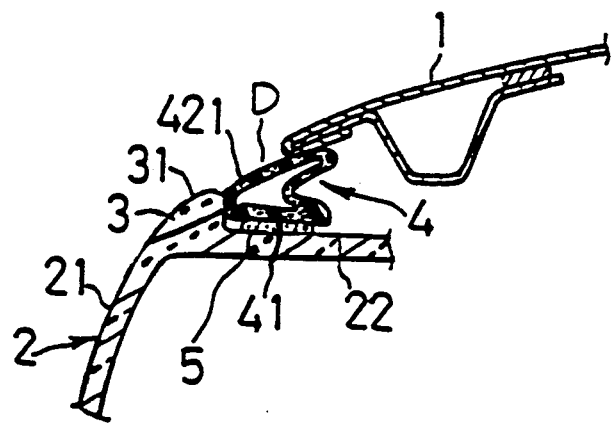
FIG. 3 is a cross-sectional view similar to that of FIG. 2, of a second embodiment of a seal structure, of the invention.

FIG. 3 illustrates a second embodiment of a seal structure in accordance with the present invention. The second embodiment differs from the first embodiment in that the seal member 4 has a tubular configuration.

The remainder of the structure of the seal structure of the second embodiment is identical to that of the first embodiment. In FIG. 3, parts similar to those in FIGS. 1 and 2 have been assigned the same reference mumerals as in these drawings.

The second embodiment achieves substantially the same operational advantages as that of the first embodiment.

Figure 4:
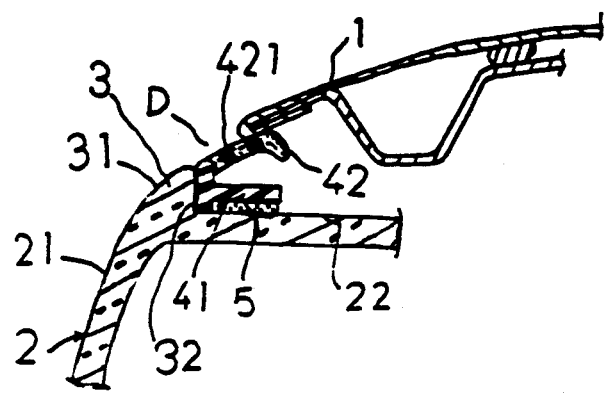
FIG. 4 is a cross-sectional view, similar to that of FIG. 2, of a third embodiment of a seal structure.
Figure 5:
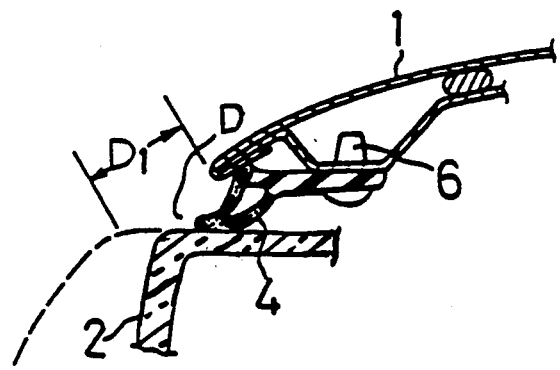
FIG. 5 is a cross-sectional view of a conventional seal structure.

FIG. 4 illustrates a third embodiment of a seal structure in accordance with the present invention. In the third embodiment, the base portion 41 of the seal member 4 is made of solid rubber whereas the lip-shaped sealing portion 42 is made of sponge rubber. The remainder of the structure of the third embodiment is substantially identical to that of the first embodiment.

In accordance with the third embodiment, the seal member 4 can be attached to each head lamp 2 more stably, as compared with the preceding embodiments because solid rubber is used.

The assembled positions of the engine hood 1 can vary upwardly or downwardly. With the third embodiment, even if the engine hood 1 is assembed at a downwardly offset position, and the lip-shaped sealing portion 42 is excessively pressed downwardly by the offset engine hood 1, the vertical part of the base portion 41 made of solid rubber will not be bent. Accordingly, no gap will exist between the upper edge of the projection 3 and the upper end of the base portion 41 of the seal member 4.

What is claimed is:

1. A seal structure for sealing a gap between a front edge of an engine hood of a motor vehicle, and an upper edge of a head lamp thereof, said head lamp having an upper surface with a front edge, comprising:

a projection formed at said front edge of said upper surface of the head lamp, a front surface of said projection being inclined upwardly and rearwardly, a top edge of said projection being spaced from said front edge of the engine hood so that a small gap is defined therebetween; and a seal member attached to said upper surface of the head lamp on a rear side of said projection, said seal member having a sealing portion having a surface which closes said small gap, wherein said projection has a triangular cross-section which is composed of an inclined surface extending from an upper end of an inclined front surface of the head lamp toward the front edge of the engine hood, and a rear surface in a plane which is substantially perpendicular to the upper surface of the head lamp, and said seal member includes a base portion having an L-shaped cross-section so as to have a vertical part and a horizontal part, and said sealing portion extends from an upper end of said vertical part of said base portion obliquely rearwardly, the height of said vertical part being substantially equal to that of said rear surface of said projection, said base portion being attached to the upper surface of the head lamp so that said vertical part closely contacts said rear surface of said projection, and said seal surface of said sealing portion, closely contacts a lower surface of the engine hood.

2. The seal structure according to claim 1, wherein said sealing portion has a lip-shaped configuration.

3. The seal structure according to claim 1, wherein said seal member has a tubular configuration.

4. The seal structure according to claim 1, wherein said seal member is made of sponge rubber.

5. The seal structure according to claim 1, wherein said base portion of said seal member is made of solid rubber and said sealing portion is made of sponge rubber.

6. The seal structures according to claim 1, wherein said seal member base portion is bonded to the upper surface of the head lamp with an adhesive tape.

7. The seal structure accordingly to claim 3, wherein said seal member is made of sponge rubber.

8. The seal structure accordingly to claim 1, wherein said seal member is made of sponge rubber.

9. The seal structure according to claim 1, wherein said base portion is bonded to the upper surface of the head lamp with an adhesive tape.

* * * * *